United States Patent
Lam et al.

(10) Patent No.: US 9,598,104 B1
(45) Date of Patent: Mar. 21, 2017

(54) STEERING KNUCKLE ASSEMBLY HAVING A STOP BOLT ASSEMBLY AND METHOD OF MANUFACTURE

(71) Applicant: ArvinMeritor Technology, LLC, Troy, MI (US)

(72) Inventors: Duy Lam, Baltimore, OH (US); Steve Hunter, Lancaster, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 14/953,524

(22) Filed: Nov. 30, 2015

(51) Int. Cl.
*B62D 7/18* (2006.01)

(52) U.S. Cl.
CPC ............ *B62D 7/18* (2013.01); *B60G 2206/50* (2013.01)

(58) Field of Classification Search
CPC .................. B62D 7/18; B60G 2206/50; B60G 2204/4306
USPC ..................................................... 280/93.512
See application file for complete search history.

(56) References Cited

U.S. PATENT DOCUMENTS

| | | | |
|---|---|---|---|
| 4,536,003 A * | 8/1985 | Maurer | B62D 5/061 180/434 |
| 5,052,528 A * | 10/1991 | Sullivan | F16F 9/48 188/282.8 |
| 5,865,452 A * | 2/1999 | Chalin | B60G 9/00 180/905 |
| 5,975,547 A * | 11/1999 | Stroh | B62D 7/18 280/93.512 |
| 7,152,866 B2 * | 12/2006 | Chalin | B60G 3/20 180/209 |
| 8,469,378 B1 | 6/2013 | Bodary et al. | |
| 8,490,986 B1 | 7/2013 | Ostrander et al. | |
| 8,544,961 B2 * | 10/2013 | Bubulka | B60B 35/003 301/124.1 |
| 9,050,855 B2 | 6/2015 | Li et al. | |
| 9,090,283 B1 | 7/2015 | Lam et al. | |
| 9,096,259 B2 | 8/2015 | Varela et al. | |
| 2006/0082094 A1 * | 4/2006 | Mosler | B60G 3/14 280/124.116 |
| 2014/0345994 A1 | 11/2014 | Varela et al. | |

FOREIGN PATENT DOCUMENTS

| | | | |
|---|---|---|---|
| JP | 06298114 A | * | 10/1994 |
| KR | 20080051429 A | * | 6/2008 |
| KR | 20100040084 A | * | 4/2010 |

OTHER PUBLICATIONS

Meritor, An ArvinMeritor brand, "Front Non-Drive Steer Axles, All Meritor Conventional, Easy Steer Plus (Trademark) and MFS Series", Revised Aug. 2007.

* cited by examiner

*Primary Examiner* — Keith Frisby
(74) *Attorney, Agent, or Firm* — Brooks Kushman P.C.

(57) ABSTRACT

A steering knuckle assembly and a method of manufacture. The steering knuckle assembly may have a steering knuckle and a stop bolt assembly. The stop bolt assembly may have an adapter, a stop screw, and a jam nut. The adapter may be received in a mounting hole in the steering knuckle. The stop screw may be threaded into the adapter. The jam nut may be disposed between the adapter and the stop screw to inhibit rotation of the stop screw.

15 Claims, 3 Drawing Sheets

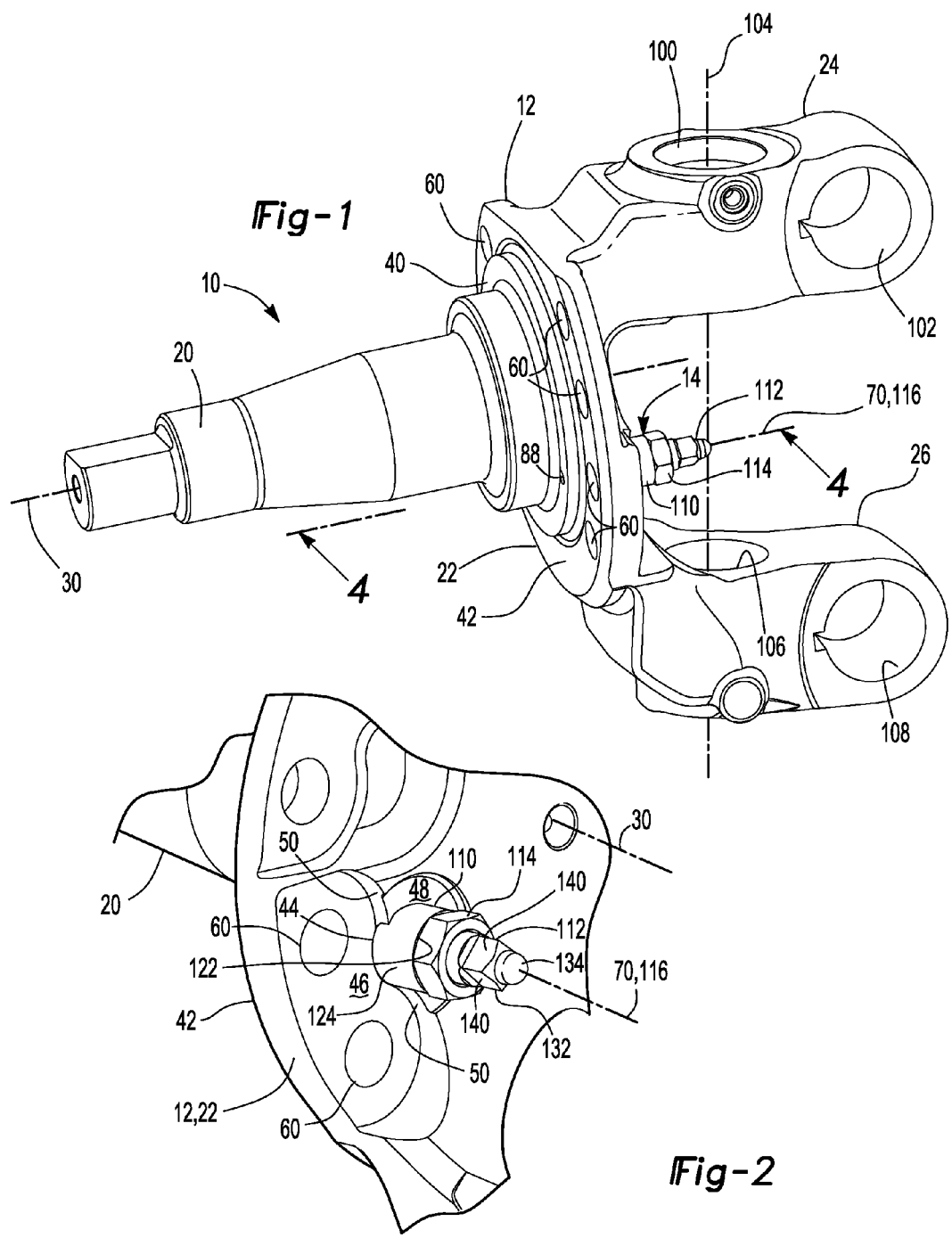

STEERING KNUCKLE ASSEMBLY HAVING A STOP BOLT ASSEMBLY AND METHOD OF MANUFACTURE

TECHNICAL FIELD

This disclosure relates to a steering knuckle assembly that has a stop bolt assembly as well as a method of manufacture.

BACKGROUND

A steering knuckle assembly is disclosed in U.S. Pat. No. 9,090,283.

SUMMARY

In at least one embodiment, a steering knuckle assembly is provided. The steering knuckle assembly may include a steering knuckle and a stop bolt assembly. The steering knuckle may have a mounting hole that may extend along an axis. The mounting hole may be at least partially defined by a first hole surface and a step surface. The first hole surface may be disposed about the axis. The step surface may extend from the first hole surface toward the axis. The stop bolt assembly may have an adapter, a stop screw, and a jam nut. The adapter may be partially received in the mounting hole and may engage the first hole surface. The adapter may have a first end surface, a second end surface, and a threaded hole. The first end surface may be disposed on the step surface. The second end surface may be disposed opposite the first end surface. The threaded hole may extend between the first end surface and the second end surface. The stop screw may have a threaded portion that may be received in the threaded hole. The jam nut may be disposed on the threaded portion of the stop screw. The jam nut may inhibit rotation of the stop screw when the jam nut abuts the second end surface.

In at least one embodiment, a method of assembling a steering knuckle assembly is provided. The method may include providing a steering knuckle and a stop bolt assembly. The steering knuckle may have a mounting hole that may extend along an axis. The mounting hole may have a first hole surface that may be radially disposed about the axis and a step surface that may extend from the first hole surface toward the axis. The stop bolt assembly may include an adapter, a stop screw, and a jam nut. The adapter may have a first end surface, a second end surface, an outer surface, and a threaded hole. The second end surface may be disposed opposite the first end surface. The outer surface may extend from the first end surface to the second end surface. The threaded hole may extend from the first end surface to the second end surface. The adapter may be inserted into the mounting hole such that the first end surface may engage the step surface and the outer surface may engage the first hole surface with an interference fit. The stop screw may be threaded into the threaded hole of the adapter and the jam nut may be threaded onto the stop screw.

BRIEF DESCRIPTION OF THE DRAWINGS

FIG. 1 is a perspective view of a steering knuckle assembly.

FIG. 2 is a magnified perspective view of a portion of the steering knuckle assembly that includes a stop bolt assembly.

DETAILED DESCRIPTION

Figure 3:
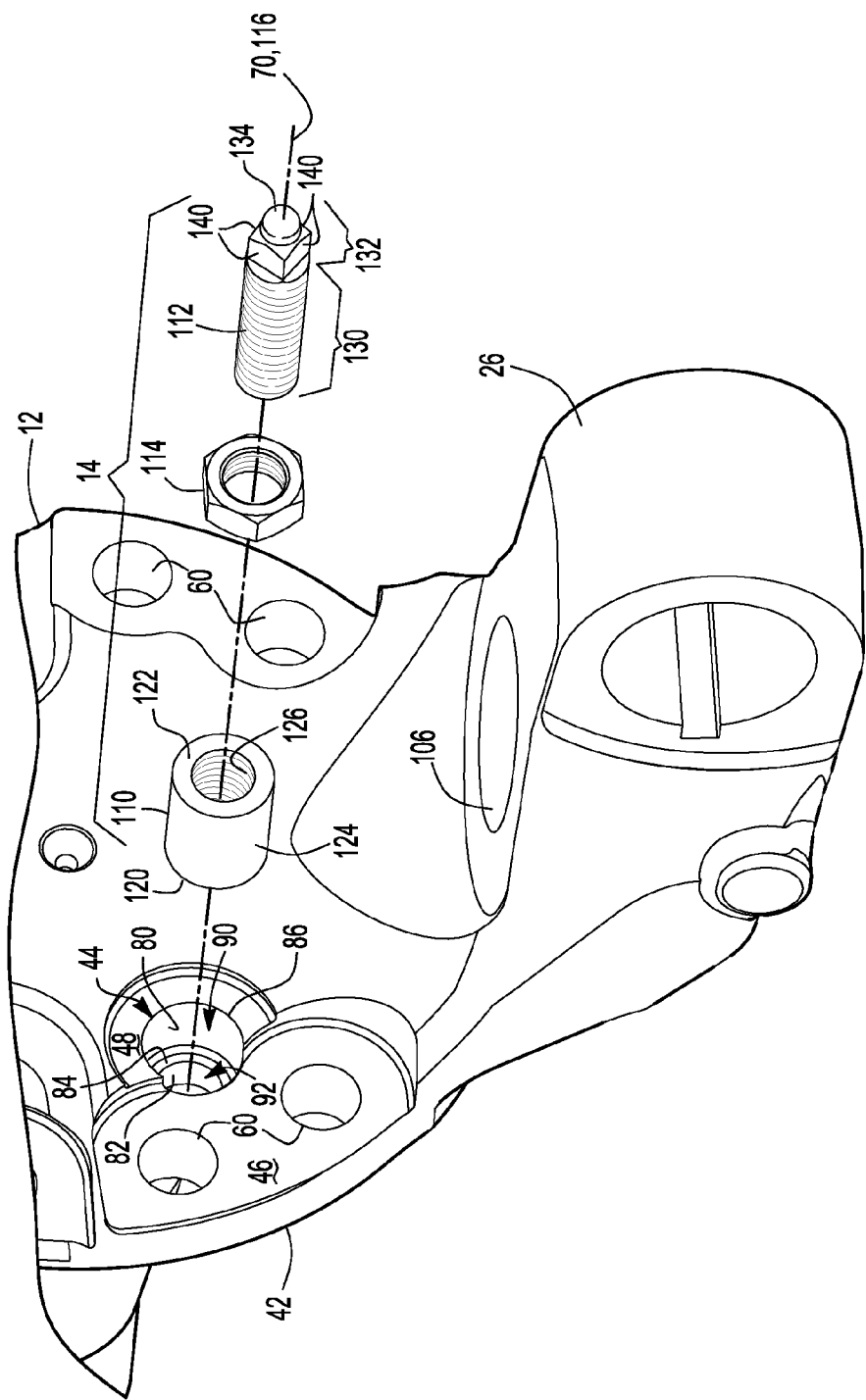
FIG. 3 is an exploded view of the stop bolt assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an exemplary steering knuckle assembly 10 is shown. The steering knuckle assembly 10 may be provided with a motor vehicle like a truck, bus, farm equipment, military transport or weaponry vehicle, or cargo loading equipment for land, air, or marine vessels. The steering knuckle assembly 10 may be part of a steering system that may be used to steer or change the direction of the vehicle. In at least one embodiment, the steering knuckle assembly 10 may include a steering knuckle 12 and a stop bolt assembly 14.

The steering knuckle 12 may interconnect a structural member or suspension member of the vehicle, such as an axle beam or control arms, to a vehicle wheel. In at least one embodiment, the steering knuckle 12 may be integrally formed or cast such that the steering knuckle 12 is provided as a unitary one-piece component. The steering knuckle 12 may include a spindle 20, a body 22, a first arm 24, and a second arm 26.

The spindle 20 may support a wheel hub assembly that may facilitate mounting and rotation of a vehicle wheel. More specifically, the spindle 20 may support one or more wheel roller bearings that may support and facilitate rotation of a wheel hub and an associated vehicle wheel. The spindle 20 may extend along a spindle axis 30 that may generally extend between the first arm 24 and a second arm 26. The spindle 20 may be integrally formed with the body 22 or may be provided as a separate component that is fastened to the body 22 in one or more embodiments.

Referring to FIGS. 1 and 2, the body 22 may facilitate mounting of various components to the steering knuckle 12. In at least one embodiment, the body 22 may include a raised portion 40, an outer portion 42, a mounting hole 44, a first inner surface 46, a second inner surface 48, and an inner step surface 50.

Referring to FIG. 1, the raised portion 40 may extend around the spindle 20. For example, the raised portion 40 may extend around and may be disposed substantially perpendicular to the spindle axis 30. As such, the raised portion 40 may be configured as a ring that may extend continuously around the spindle 20. The raised portion 40 may be offset from the outer portion 42 such that the raised portion 40 may be disposed closer to a distal end of the spindle 20 than the outer portion 42.

The outer portion 42 may extend around the raised portion 40. For example, the outer portion 42 may extend around and may be disposed substantially perpendicular to the spindle axis 30. As such, the outer portion 42 may be substantially configured as a ring that may extend continuously around the raised portion 40. The outer portion 42 may include a set of brake mounting holes 60.

The brake mounting holes 60 may be spaced apart from each other and may be arranged around the spindle axis 30. The brake mounting holes 60 may be configured as through holes that may extend through the body 22 from the outer portion 42 to the opposite side of the body 22. The brake mounting holes 60 may be configured to receive a corresponding fastener, such as a bolt, that may facilitate mounting of a brake component, such as a brake caliper or a brake spider, to the steering knuckle 12.

Referring to FIGS. 2 and 3, the mounting hole 44 may facilitate mounting of the stop bolt assembly 14. The mounting hole 44 may extend along an axis 70. The axis 70 may be disposed substantially parallel to the spindle axis 30. In at least one embodiment, the mounting hole 44 may be at least partially defined by one or more surfaces of the steering knuckle 12, such as a first hole surface 80, a second hole surface 82, and a step surface 84. In addition, the mounting hole 44 may have a first opening 86 and a second opening 88, which is best shown in FIGS. 1 and 4.

Figure 4:
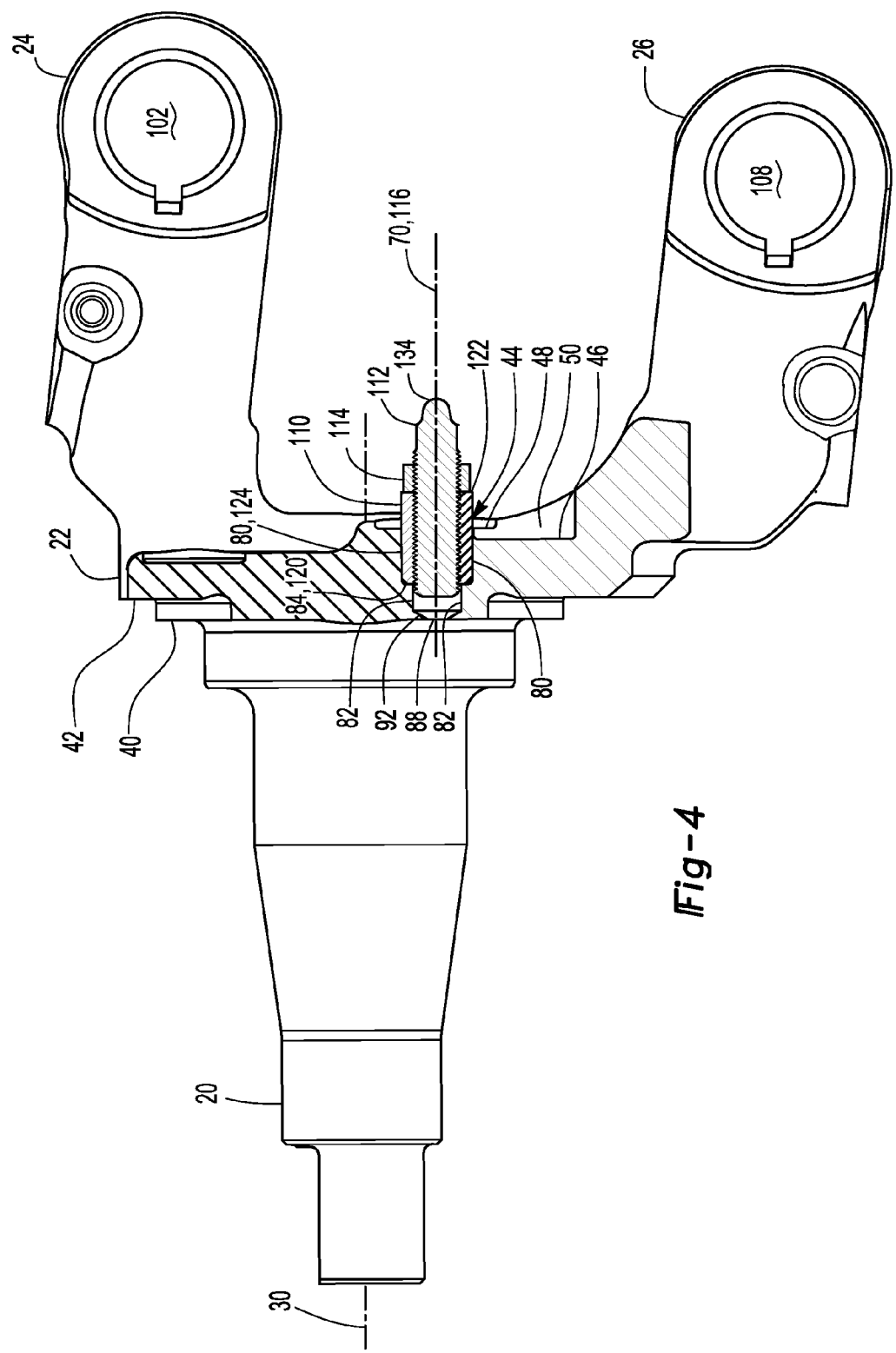
FIG. 4 is a section view along section line 4-4.

Referring to FIGS. 3 and 4, the first hole surface 80 may be disposed about the axis 70. For instance, the first hole surface 80 may be radially disposed about the axis 70 or disposed at a substantially constant radial distance from the axis 70. The first hole surface 80 may extend from the step surface 84 to the first opening 86. The first hole surface 80 may at least partially define a first portion 90 of the mounting hole 44. The first hole surface 80 may be substantially smooth and provided without threads to help facilitate mounting of the stop bolt assembly 14 as will be discussed in more detail below.

The second hole surface 82 may be disposed opposite the first hole surface 80. For instance, the second hole surface 82 may extend from the step surface 84 to or toward the raised portion 40. As such, the second hole surface 82 may extend from the step surface 84 in a direction that extends away from the first hole surface 80 and the first portion 90 of the mounting hole 44. In FIG. 4, the second hole surface 82 extends from the step surface 84 to the second opening 88. The second hole surface 82 may be smaller than the first hole surface 80 or may have a smaller diameter than the first hole surface 80. The second hole surface 82 may be radially disposed about the axis 70 along all or a portion of its axial length. In FIG. 4, the second hole surface 82 is disposed at a substantially constant radial distance from the axis 70 along a distance that extends from the step surface 84 toward the raised portion 40, and then is tapered or becomes narrower proximate the second opening 88. The second hole surface 82 may at least partially define a second portion 92 of the mounting hole 44.

The step surface 84 may extend from the first hole surface 80 to the second hole surface 82. As such, the step surface 84 may be disposed inside the steering knuckle 12 between the first opening 86 and the second opening 88 of the mounting hole 44. Moreover, the step surface 84 may divide or separate the mounting hole 44 into the first portion 90 and the second portion 92. The step surface 84 may be disposed substantially perpendicular to the axis 70 in one or more embodiments.

The first opening 86 may be disposed at an end of the mounting hole 44 and may be defined by the first hole surface 80 and one or more intersecting surfaces of the steering knuckle 12. For instance, the first opening 86 and may be disposed in a side of the body 22 that may be disposed opposite the raised portion 40.

The second opening 88 may be provided when the mounting hole 44 extends completely through the steering knuckle 12. The second opening 88 may be disposed opposite the first opening 86. The second opening 88 may be defined by the second hole surface 82 and may be disposed in and may extend to the raised portion 40. The second opening 88 may be smaller than the first opening 86 or may have a smaller diameter than the first opening 86. As such, the second opening 88 may be sized to inhibit or prevent the stop bolt assembly 14 from extending completely through the body 22 of the steering knuckle 12.

Referring to FIG. 2, an exemplary region of the steering knuckle 12 that is disposed proximate the first opening 86 is shown. This region may include the first inner surface 46, second inner surface 48, and the inner step surface 50; however, it is contemplated that one or more of the surfaces may be omitted in various embodiments.

The first inner surface 46 may be disposed opposite the outer portion 42. The first inner surface 46 may extend partially around the first opening 86 of the mounting hole 44. One or more brake mounting holes 60 may extend from the first inner surface 46. In addition, the first inner surface 46 may be disposed substantially perpendicular to the axis 70.

The second inner surface 48 may be disposed closer to the spindle axis 30 than the first inner surface 46. For example, the second inner surface 48 may be disposed opposite the raised portion 40. The second inner surface 48 may extend partially around the first opening 86 of the mounting hole 44. In addition, the second inner surface 48 may be offset from the first inner surface 46. For instance, the second inner surface 48 may be disposed further from the outer portion 42 than the first inner surface 46. The second inner surface 48 may be disposed substantially parallel to the first inner surface 46. As is best shown in FIG. 4, the step surface 84 may be positioned at a greater depth than the first inner surface 46 and the second inner surface 48. As such, the step surface 84 may be disposed closer to the raised portion 40 and the outer portion 42 than the first inner surface 46 and the second inner surface 48.

The inner step surface 50 may extend from the first inner surface 46 to the second inner surface 48. In FIG. 3, two inner step surfaces 50 are shown. The inner step surface 50 may extend from the first opening 86 of the mounting hole 44. As such, the first inner surface 46, the second inner surface 48, and the inner step surface 50 may cooperate to at least partially define the first opening 86 of the mounting hole 44.

Referring to FIGS. 1 and 4, the first arm 24 may extend from the body 22. The first arm 24 may generally extend in an opposite direction from the spindle 20 and may be disposed above the spindle 20 near the top of the body 22. The first arm 24 may include a first kingpin hole 100 and a steering arm hole 102.

The first kingpin hole 100 may be configured to receive a kingpin that may couple the steering knuckle 12 to a structural member of the vehicle, such as an axle beam or linkage such that the steering knuckle 12 may pivot about the kingpin. The first kingpin hole 100 may be a through hole that may extend through the first arm 24. The first kingpin hole 100 and the kingpin may be disposed along a kingpin axis 104.

The steering arm hole 102 may be disposed proximate a distal end of the first arm 24. The steering arm hole 102 may facilitate coupling of the steering knuckle 12 to a linkage, such as a rod or steering arm, that may transmit force to rotate the steering knuckle 12 about the kingpin axis 104.

The second arm 26 may extend from the body 22 and may be spaced apart from the first arm 24. The second arm 26 may extend in an opposite direction from the spindle 20 and may be disposed below the spindle 20 near the bottom of the body 22. The second arm 26 may include a second kingpin hole 106 and a tie rod mounting hole 108.

The second kingpin hole 106 may be disposed along the kingpin axis 104 and may be configured to receive the kingpin. The second kingpin hole 106 may be a through hole that may extend through the second arm 26.

The tie rod mounting hole 108 may be disposed proximate a distal end of the second arm 26. The tie rod mounting hole 108 may receive or may be coupled to a tie rod that may help facilitate steering of the vehicle.

Referring to FIGS. 1 and 2, the stop bolt assembly 14 may be mounted to the steering knuckle 12. The stop bolt assembly 14 may be a mechanical stop that may control the maximum turn angle of the steering knuckle 12 about the kingpin axis 104. The maximum turn angle may be measured with respect to a nominal steering knuckle rotational position or position in which the steering knuckle 12 may be disposed when the vehicle is traveling straight or not turning. The stop bolt assembly 14 may be adjustable. A tire associated with the steering knuckle 12 may not rub against the frame or other vehicle components when the stop bolt assembly 14 is properly adjusted. As such, the stop bolt assembly 14 may help prevent damage to a tire and steering system components such as steering arms, tie rods, or tie rod ends, when the stop bolt assembly 14 is properly adjusted.

Referring to FIGS. 2-4, the stop bolt assembly 14 may be a three-piece assembly that may only include an adapter 110, a stop screw 112, and a jam nut 114. In addition, the stop bolt assembly 14 may extend along a stop bolt assembly axis 116. The stop bolt assembly axis 116 may be coaxially disposed with the axis 70 when the stop bolt assembly 14 is assembled to the steering knuckle 12.

Referring primarily to FIG. 3, the adapter 110 may be partially received in the mounting hole 44. More specifically, the adapter 110 may extend through and may be received in the first opening 86 of the mounting hole 44 and may be received in the first portion 90 of the mounting hole 44. The adapter 110 may have a first end surface 120, a second end surface 122, an outer surface 124, and a threaded hole 126.

The first end surface 120 may be disposed at an end of the adapter 110. As is best shown in FIG. 4, the first end surface 120 may be disposed on and may engage the step surface 84 when the adapter is inserted into the mounting hole 44. As such, the step surface 84 may limit the depth to which the adapter 110 may be inserted into the mounting hole 44 such that the adapter 110 may be received in the first portion 90 of the mounting hole 44, but may not be received in the second portion 92 of the mounting hole 44.

The second end surface 122 may be disposed opposite the first end surface 120. The second end surface 122 may not be received in the mounting hole 44 and may engage the jam nut 114 as will be discussed in more detail below.

The outer surface 124 may extend from the first end surface 120 to the second end surface 122. The outer surface 124 may be radially disposed about the stop bolt assembly axis 116 and may be an outside circumferential surface of the adapter 110 that may be substantially smooth and free of threads. The outer surface 124 may be partially received in the mounting hole 44 of the steering knuckle 12. Moreover, the outer surface 124 may engage the first hole surface 80 with an interference fit. As such, the adapter 110 may be fixedly disposed on the steering knuckle 12 in the mounting hole 44.

The threaded hole 126 may extend between the first end surface 120 and the second end surface 122. For example, the threaded hole 126 may include one or more threads that may extend from the first end surface 120 to the second end surface 122.

The stop screw 112 may extend along the stop bolt assembly axis 116. In at least one embodiment, the stop screw 112 may have a threaded portion 130, a tool engagement portion 132, and a head 134.

The threaded portion 130 may be received in the threaded hole 126 of the adapter 110. The threaded portion 130 may have one or more threads that may mate with the thread or threads of the threaded hole 126. As is best shown in FIG. 4, the stop screw 112 may extend through the threaded hole 126 such that the stop screw 112 may be received in and may extend through the first portion 90 of the mounting hole 44 and may extend past the second end surface 122 of the adapter 110 and extend into the second portion 92 of the mounting hole 44. The portion of the stop screw 112 that is disposed in the second portion 92 of the mounting hole 44 may be spaced apart from the second hole surface 82. The second opening 88 of the mounting hole 44 may have a smaller diameter than the threaded portion 130 of the stop screw 112. As such, the stop screw 112 may not extend through the second opening 88 in one or more embodiments.

Referring again to FIG. 3, the tool engagement portion 132 may be disposed between the threaded portion 130 and the head 134. As such, the tool engagement portion 132 may extend from the threaded portion 130 to the head 134. The tool engagement portion 132 may have a plurality of flats 140. The flats 140 may be arranged around the stop bolt assembly axis 116 and may facilitate engagement of a tool, such as a wrench, that may be used to rotate the stop screw 112. In the embodiment shown, four flats 140 are provided; however, it is contemplated that a greater or lesser number of flats may be provided in one or more embodiments. In at least one embodiment, the tool engagement portion 132 and its flats 140 may be disposed closer to the stop bolt assembly axis 116 than the threaded portion 130.

The head 134 may extend from the tool engagement portion 132 such that the tool engagement portion 132 may be disposed between the threaded portion 130 and the head 134. The head 134 may contact a vehicle structural component to limit rotation of the steering knuckle 12. The head 134 may be rounded or bullet-shaped. For instance, an exterior surface of the head 134 or portion of the head 134 may be substantially semispherical. Providing a rounded or curved head may allow the stop screw 112 to be compatible with different steering knuckle and steering system designs as the rounded head may be compatible with different vehicle structural component geometries that may be provided with different vehicles. The head 134 may be disposed closer to the stop bolt assembly axis 116 than the tool engagement portion 132 and plurality of flats 140. As such, the head 134 may not extend outward past the threaded portion 130 in one or more embodiments.

The jam nut 114 may be disposed on the threaded portion 130 of the stop screw 112. The jam nut 114 may inhibit rotation of the stop screw 112 when the jam nut 114 abuts the second end surface 122 of the adapter 110. The jam nut 114 may have a hole with one or more internal threads that may mate with the threaded portion 130 of the stop screw 112 to facilitate rotation of the jam nut 114 and movement of the jam nut 114 along the stop bolt assembly axis 116.

Exemplary methods of assembling a steering knuckle assembly 10 will now be described. The method steps may be associated with installation of the stop bolt assembly 14 on the steering knuckle 12.

First, the adapter 110 may be inserted into the mounting hole 44 of the steering knuckle 12. The adapter 110 may aligned with the mounting hole 44 such that the outer surface 124 of the adapter 110 may be aligned with the first hole surface 80 of the mounting hole 44. The adapter 110 may then be inserted through the first opening 86 of the mounting hole 44 until the first end surface 120 of the adapter 110 engages the step surface 84. The adapter 110 may be press fit into the mounting hole 44 such that the outer surface 124 may engage the first hole surface 80 with an interference fit as previously discussed.

Next, the stop screw 112 and the jam nut 114 may be installed on the adapter 110. The stop screw 112 may be threaded into the threaded hole 126 of the adapter 110 by rotating the stop screw 112 about the stop bolt assembly axis 116. The stop screw 112 may be threaded through the adapter 110 to the first end surface 120 or past the first end surface 120 in one or more embodiments. The jam nut 114 may be threaded onto the stop screw 112 either before the stop screw 112 is threaded into the threaded hole 126 of the adapter or after the stop screw 112 is threaded into the threaded hole 126 of the adapter 110.

The steering knuckle 12 may be rotated about the kingpin axis 104 to the maximum turn angle to verify that the maximum turn angle meets the vehicle manufacturer's specifications. The maximum turn angle may be adjusted or corrected to meet the vehicle manufacturer's specifications if applicable.

Next, the stop screw 112 may be rotated to position the head 134 of the stop screw 112 at a desired distance from a vehicle structural component that may limit rotation of the steering knuckle 12, such as a boss on an axle or axle beam. For example, the head 134 may be rotated to provide a predetermined gap between the head 134 and an axle beam boss. The predetermined gap may be any suitable amount. As one nonlimiting example, the predetermined gap may be approximately 0.125 inches (approximately 3 mm). A spacer having a thickness corresponding to the predetermined gap may be positioned between the head 134 of the stop screw 112 to facilitate measurement of the gap and adjustment of the stop screw 112.

Next, the jam nut 114 may be tightened against the second end surface 122 of the adapter 110 to secure and inhibit movement of the stop screw 112. The jam nut 114 may be tightened to a predetermined torque.

The steering knuckle assembly and method discussed above may allow a stop bolt assembly to be provided with three components. A three-piece stop bolt assembly may provide advantages over a two-piece design that may not include an adapter in that a three-piece design having an adapter may allow a thinner steering knuckle body to be provided, which may reduce package space and weight. Moreover, the adapter may provide greater thread engagement and provide a greater adjustment range for the stop screw. The three-piece stop bolt assembly may also provide advantages over a four-piece design that may include an adapter that may be threaded directly into the steering knuckle and that may have a washer that may be disposed between the adapter and the steering knuckle by eliminating the washer, by providing a simpler and less expensive adapter design, and by eliminating manufacturing steps associated with providing a threaded hole in the steering knuckle to accommodate external threads on the adapter. As such, a three-piece design may have fewer parts, fewer or less expensive manufacturing steps, and may reduce cost and complexity as compared to a four piece design. In addition, a three-piece design may allow a single stop screw design having a standardized length to be used with different steering knuckle designs rather than stop screws having different lengths that may be dictated by the thickness of the steering knuckle or adapter length.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A steering knuckle assembly comprising:
    a steering knuckle that has a mounting hole that extends along an axis, the mounting hole being at least partially defined by a first hole surface that is disposed about the axis and a step surface that extends from the first hole surface toward the axis; and
    a stop bolt assembly that includes:
        an adapter that is partially received in the mounting hole and engages the first hole surface, the adapter having a first end surface that is disposed on the step surface, a second end surface disposed opposite the first end surface, and a threaded hole that extends between the first end surface and the second end surface;
        a stop screw that has a threaded portion that is received in the threaded hole; and
        a jam nut that is disposed on the threaded portion of the stop screw, wherein the jam nut inhibits rotation of the stop screw when the jam nut abuts the second end surface.

2. The steering knuckle assembly of claim 1 wherein the adapter has an outer surface that engages the first hole surface with an interference fit.

3. The steering knuckle assembly of claim 2 wherein the stop bolt assembly extends along a stop bolt assembly axis and the outer surface is radially disposed about the stop bolt assembly axis.

4. The steering knuckle assembly of claim 1 wherein the steering knuckle has a second hole surface that extends from the step surface in a direction that extends away from the first hole surface, wherein the first hole surface defines a first portion of the mounting hole and the second hole surface defines a second portion of the mounting hole, wherein the adapter is received in the first portion but not the second portion and the stop screw is received in the first portion and the second portion.

5. The steering knuckle assembly of claim 4 wherein the stop screw is spaced apart from the second hole surface.

6. The steering knuckle assembly of claim 1 wherein the mounting hole extends through the steering knuckle and has a first opening that receives the adapter and a second opening disposed opposite the first opening, wherein the second opening has a smaller diameter than the first opening.

7. The steering knuckle assembly of claim 6 wherein the second opening has a smaller diameter than the stop screw.

8. The steering knuckle assembly of claim 6 wherein the steering knuckle has a spindle, a raised portion that extends from the spindle, and an outer portion that extends around the raised portion and has a set of brake mounting holes, wherein the second opening is disposed in the raised portion.

9. The steering knuckle assembly of claim 8 wherein the steering knuckle has a first inner surface disposed opposite the outer portion, a second inner surface that is offset from the first inner surface, and an inner step surface that extends from the first inner surface to the second inner surface, wherein the first inner surface, the second inner surface, and the inner step surface cooperate to at least partially define the first opening of the mounting hole.

10. The steering knuckle assembly of claim 9 wherein at least one brake mounting hole extends from the first inner surface.

11. The steering knuckle assembly of claim 9 wherein the step surface is disposed closer to the outer portion of the steering knuckle than the first inner surface.

12. The steering knuckle assembly of claim 1 wherein the stop screw has a tool engagement portion that extends from the threaded portion and a rounded head that extends from the tool engagement portion such that the tool engagement portion is disposed between the threaded portion and the rounded head.

13. The steering knuckle assembly of claim 12 wherein the rounded head is substantially semispherical.

14. The steering knuckle assembly of claim 12 wherein the stop screw extends along a stop bolt assembly axis and the tool engagement portion has a plurality of flats that are disposed closer to the stop bolt assembly axis than the threaded portion.

15. The steering knuckle assembly of claim 14 wherein an exterior surface of the rounded head is disposed closer to the stop bolt assembly axis than the plurality of flats.

* * * * *